(12) United States Patent
Adams et al.

(10) Patent No.: US 6,866,315 B2
(45) Date of Patent: Mar. 15, 2005

(54) RECEIVER ASSEMBLY WITH LOAD BED EXTENDER

(75) Inventors: Katherine A. Adams, Mishawaka, IN (US); Jason R. Moldthan, Osceola, IN (US); Richard W. McCoy, Granger, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 0 days.

(21) Appl. No.: 10/415,066

(22) PCT Filed: Oct. 2, 2001

(86) PCT No.: PCT/US01/30777

§ 371 (c)(1),
(2), (4) Date: Apr. 24, 2003

(87) PCT Pub. No.: WO02/34574

PCT Pub. Date: May 2, 2002

(65) Prior Publication Data

US 2004/0023626 A1 Feb. 5, 2004

Related U.S. Application Data

(60) Provisional application No. 60/243,383, filed on Oct. 26, 2000.

(51) Int. Cl.[7] ................................................ B60R 9/00
(52) U.S. Cl. .................... 296/3; 296/26.08; 224/405; 224/488; 224/518
(58) Field of Search ............... 296/3, 26.08, 26.09; 224/402, 403, 404, 405, 511, 517, 518, 519, 488

(56) References Cited

U.S. PATENT DOCUMENTS

| | | |
|---|---|---|
| 2,712,470 A | 7/1955 | Cardini |
| 2,729,499 A | 1/1956 | Eggum |
| 2,784,027 A | 3/1957 | Temp |
| 2,852,303 A | 9/1958 | Hopson |
| 4,023,850 A | 5/1977 | Tillery |
| 4,475,760 A | 10/1984 | Morgan |
| 4,856,686 A | 8/1989 | Workentine |
| 4,856,840 A | 8/1989 | Hanley |
| 4,915,276 A * | 4/1990 | Devito .................. 224/521 |
| 4,950,010 A * | 8/1990 | Denny .................. 293/117 |
| 4,951,991 A | 8/1990 | Haigler |
| 5,120,102 A | 6/1992 | Cumbie |
| 5,215,234 A * | 6/1993 | Pasley .................. 224/508 |
| 5,451,088 A | 9/1995 | Broad |
| 5,458,389 A | 10/1995 | Young |
| 5,501,500 A | 3/1996 | Cannon |
| 5,560,666 A | 10/1996 | Vieira et al. |
| 5,678,743 A | 10/1997 | Johnson et al. |
| 5,950,890 A * | 9/1999 | Darby .................. 224/402 |
| 6,050,627 A | 4/2000 | Lee |

* cited by examiner

Primary Examiner—Joseph D. Pape
(74) Attorney, Agent, or Firm—King & Schickli, PLLC; Todd Benni McDonald Hopkins Co., LPA

(57) ABSTRACT

A receiver assembly (10) allows one to carry an elongated article or articles having a length exceeding a load bed/rack of a vehicle to which the receiver assembly (10) is attached. The receiver assembly includes a central frame member (14), a pair of mounting brackets (30) to secure the central frame member (14) and load bed/rack extender assembly (50). The bed/rack extender assembly (50) includes a pair of L-shaped space support members (60,62). Either end of the spaced support members may be connected into the accessory receivers (52) so that the extender assembly (50) may be selectively secured in one of two positions.

23 Claims, 3 Drawing Sheets

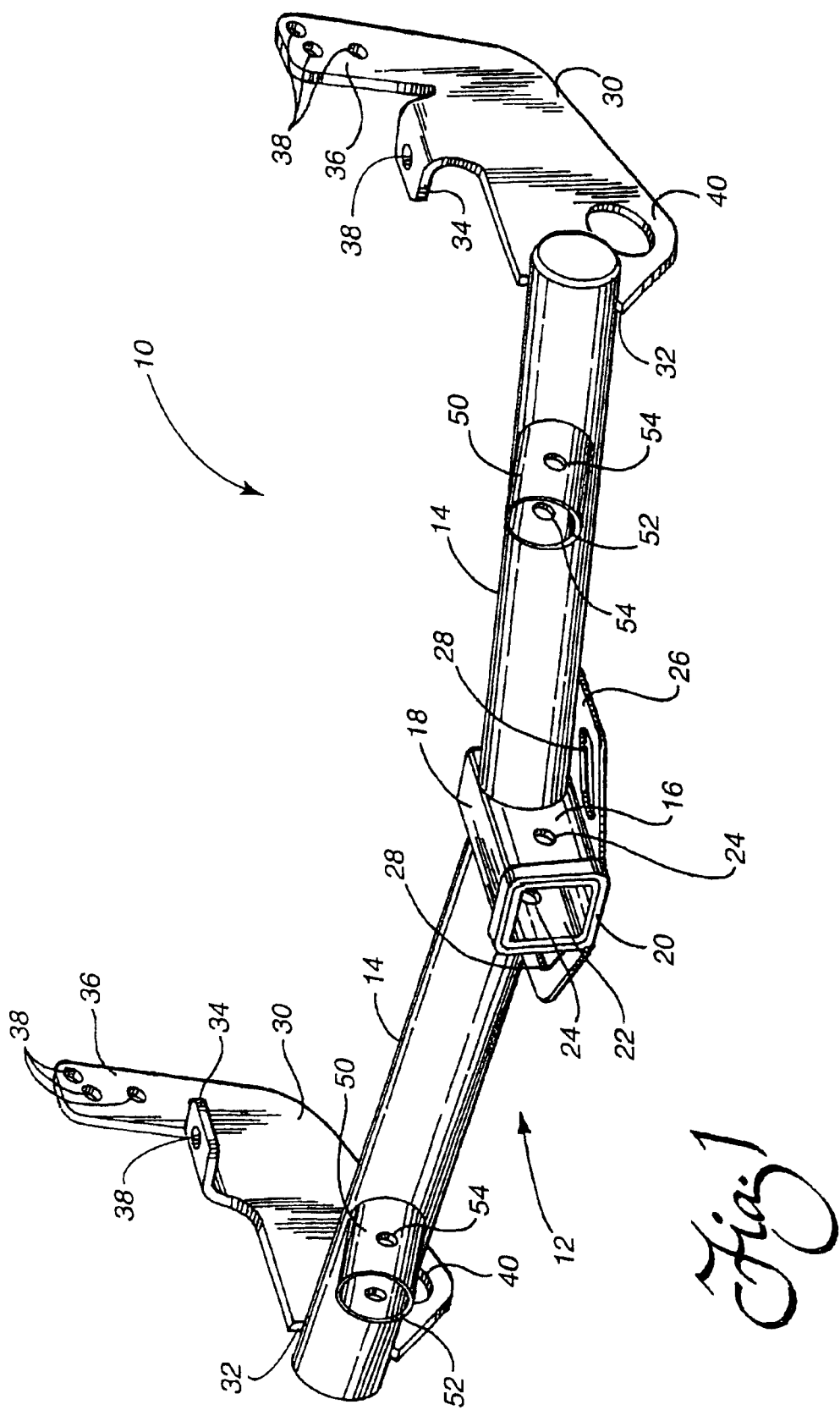

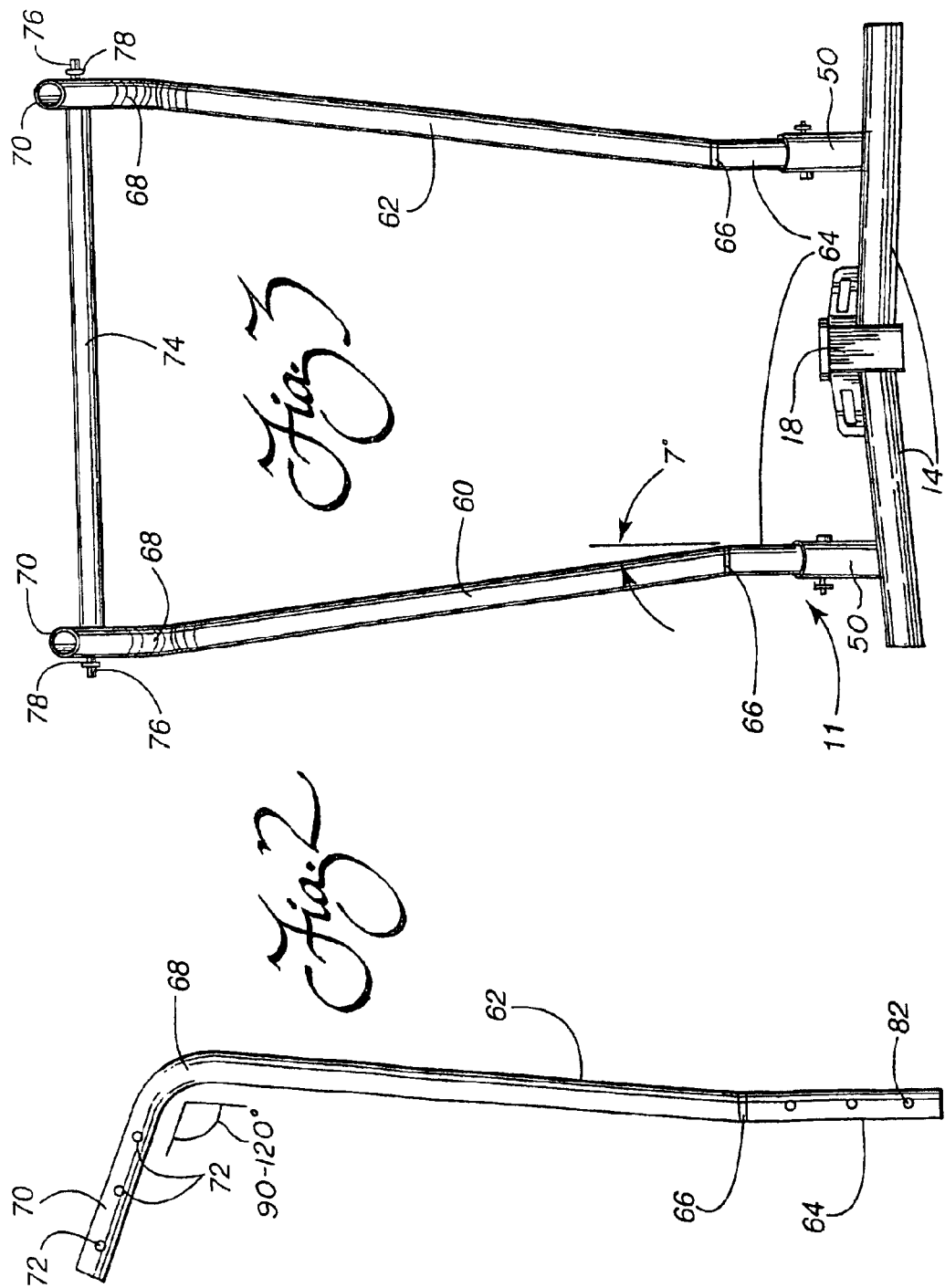

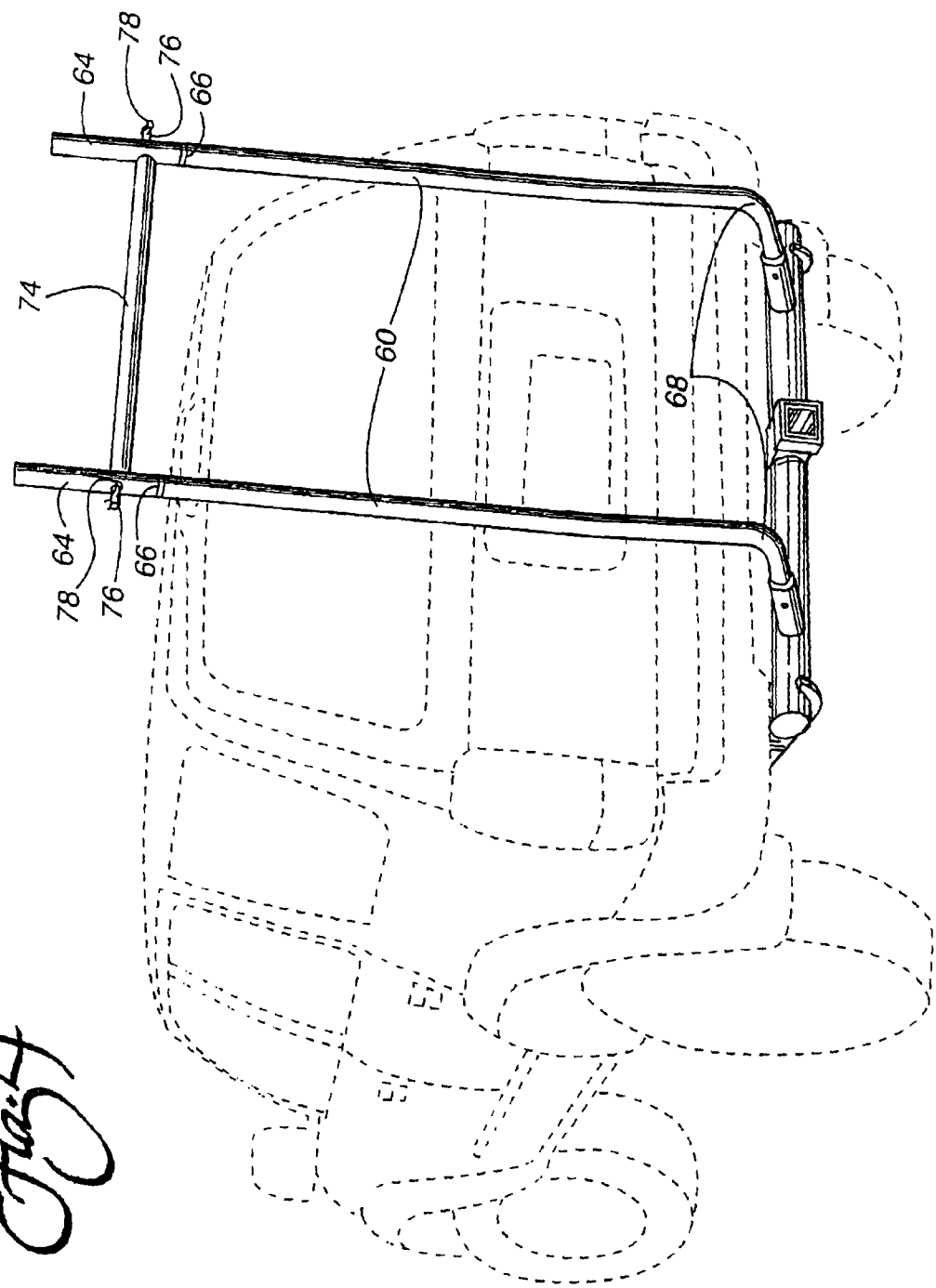

RECEIVER ASSEMBLY WITH LOAD BED EXTENDER

This is a U.S. National Stage Application of International Patent Application Ser. No. PCT/US01/30777 filed Oct. 2, 2001 which claims the benefit of U.S. Provisional Application Ser. No. 60/243,383 filed Oct. 26, 2000.

TECHNICAL FIELD

The present invention relates generally to accessories for the towing equipment field and, more particularly, to a receiver assembly including a load bed/rack extender.

BACKGROUND OF THE INVENTION

It has long been known to construct towing hitches that are mounted to vehicles in order to allow the towing of trailers or the like. In recent years such hitches have been designed to include a receiver box having a rearwardly directed opening or cavity for the receipt of a hitch or draw bar that carries a hitch ball or other means allowing connection to a trailer. Examples of such a structure include the Insta-Hitch II and Custom Hitch Receiver 35365 as manufactured by Reese Products, Inc. of Elkhart. Indiana. Such a hitch receiver is also disclosed in, for example, U.S. Pat. No. 3,768,837 to Reese, owned by Reese Products, Inc.

Recent efforts to enhance the versatility of a hitch receiver have led to development of various accessories (e.g., both open and closed article carriers, bike racks, ski racks, tables, winches or other equipment) mounted by means of an accessory mounting bar in the receiver box of a trailer hitch receiver assembly. Because of their convenience and suitability to the particular applications/interests of the user, such accessories have become very popular.

In order to allow for or accommodate trailer towing and accessory mounting simultaneously, a receiver assembly with both a trailer hitch receiver and towing accessory ports has been recently developed and is the subject of, for example, U.S. patent application Ser. No. 60/194,502, filed Apr. 3, 2000 and 60/243,486 filed Oct. 26, 2000. This new trailer hitch receiver assembly includes a central frame member, a mounting bracket carried on each end of the central frame member for securing the central frame member to the vehicle, a hitch receiver box carried on the central frame member and at least one accessory receiver having a port for receiving and holding a recreational and/or utilitarian accessory.

The present invention relates to a load bed/rack extender particularly adapted for mounting in a receiver box and/or one or more accessory receivers of a trailer hitch receiver assembly. The load bed/rack extender allows the user to conveniently haul an article or articles having a length exceeding that of the load bed. With the load bed/rack extender in place, the portion of the article(s) exceeding the length of the load bed/rack is effectively and efficiently supported for added stability and protection against inadvertent damage.

SUMMARY OF THE INVENTION

In accordance with the purposes of the present invention as described herein, a receiver assembly is provided for carrying an elongated article or articles having a length exceeding a load bed/rack of a vehicle to which the receiver assembly is attached. The receiver assembly comprises a central frame member, a pair of mounting brackets carried on the central frame member for securing the receiver assembly to the vehicle, a pair of spaced accessory receivers carried on the central frame member and a bed/rack extender assembly secured in the pair of spaced accessory receivers. In the illustrated embodiment of the invention, the receiver assembly also includes an optional hitch receiver box carried on the central frame member. The receiver box is adapted to receive a hitch or draw bar that carries a hitch ball or other means for making a connection to a trailer.

More particularly describing the invention, the bed/rack extender assembly includes a pair of spaced support members. Each of these spaced support members has a first end that is received and held by one of the pair of accessory receivers. Each support member is substantially L-shaped and includes a first, transverse bend of between substantially 3–11° in a first plane and a second, vertical bend of between about 90° to about 120° in a second plane. The first and second planes are substantially perpendicular to one another.

Additionally, each of the pair of spaced support members includes a second end having a series of spaced mounting apertures. A cross piece extends between the pair of spaced support members and is secured thereto by engaging the spaced mounting apertures. More particularly, a pair of pins secure the cross piece in the spaced mounting apertures. The bed/rack extender assembly is secured in the spaced accessory receiver by a pair of fasteners such as pin and cooperating pin clip fasteners of a type well known in the art such as used to secure a hitch bar or draw bar in a receiver box of a receiver assembly. Of course, any other appropriate fastener could be used.

An exemplary embodiment of the present invention is shown and described simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a perspective view showing a receiver assembly of the type used to hold the truck bed/rack extender of the present invention;

FIG. 2 is a top plan view of the bed/rack extender assembly portion of the present invention attached to the receiver assembly shown in FIG. 1;

FIG. 3 is a left side elevational view of the bed/rack extender assembly portion of the present invention; and FIG. 4 is a perspective view showing the bed extender assembly anchored in the alternative, upright position.

Reference will no be made in detail to the illustrated embodiment of the invention.

DETAILED DESCRIPTION OF THE INVENTION

Reference is now made to FIGS. 1–3 showing a receiver assembly, generally designated by reference numeral 10 and bed/rack extender assembly, generally designated by reference numeral 11.

The receiver assembly 10 includes a central frame member or cross member 12 preferably formed from a pair of tubular steel sections 14 welded to the opposed side walls 16 of a centrally located receiver box 18 so as to project outwardly in opposing directions. The tubular steel sections 14 may be formed with a round cross section as shown in the drawing figures, a square cross section or any other appropriate shape providing the necessary strength to function as a receiver assembly.

The receiver box 18 includes a reinforced lip 20 defining an opening leading to a hitch bar receiving cavity 22. Aligned apertures 24 in the opposing side walls 16 of the receiver box 18 allow the secure connection of a hitch bar in the receiver box in a manner well known in the art by means of a connecting pin and cooperating pin clip connector as is well known in the art. A chain plate 26 of steel material is welded to the receiver box 18 and tubular steel sections 14 in order to strengthen the connection. As is known in the art, chain plate 26 includes two apertures 28. The safety chains of a trailer may be connected to the chain plate 26 through engagement in these apertures 28.

Vehicle mounting brackets 30 are mounted adjacent the distal end of each tubular section 14. More specifically each mounting bracket 30 includes a notch 32 sized and shaped to receive the tubular section 14. The brackets 30 are welded to the tubular sections 14 in order to complete the connection.

The mounting brackets 30 each include a mounting flange 34 and an upwardly projecting mounting lug 36, both with apertures 38. Nut and bolt fasteners (not shown) are extended through these apertures 38 and cooperating apertures drilled in the frame of the towing vehicle in order to mount the receiver assembly 10 thereto.

As also shown in FIG. 1, the receiver assembly 10 incorporates a pair of tow hooks or loops 40, one integrally formed in each mounting bracket 30. The tow hooks 40 may be engaged with a tow line such as a rope, chain or cable in order to complete certain towing applications. As also shown, the receiver assembly 10 includes a pair of accessory receivers 50 carried on the tubular sections 14 of the central frame member 12. Each of the accessory receivers 50 is formed from a steel tube that is welded to the section 14 so that one accessory receiver is positioned between the receiver box 18 and each mounting bracket 30.

As shown, each accessory receiver 50 includes a circular port or opening 52 and cooperating aligned apertures 54 in the sidewall thereof to allow secure connection of a useful accessory by means of a connecting pin and pin clip of a type well known in the art (such as utilized to secure the hitch bar in the receiver box 18). Of course, while a circular port/opening 52 is shown, it should be appreciated that substantially any shape of opening could be utilized (e.g., elliptical, triangular, rectangular, pentagonal, hexagonal, octagonal). Each of the accessory receivers 50 is oriented with respect to the central frame member 12, receiver box 18 and the towing vehicle upon which the assembly 10 is mounted so as to be readily accessible by the towing vehicle operator. More specifically, each accessory receiver 50 defines an acute included angle of between, for example, about 10° to about 30° or about 20° with the plane in which lies the longitudinal axis of the central frame member 12 and the receiver box 18.

As best shown in FIGS. 2–3 the bed/rack extender assembly 11 includes a pair of spaced support members 60, 62. Each of the support members 60, 62 has a first end 64 sized and shaped for complementary receipt in one of the accessory ports 52 in the cooperating pair of accessory receivers 50. A series of mounting apertures 82 are provided at spaced locations along the first ends 64. When the first ends 64 are properly seated in the accessory receivers 50, one of the spaced apertures 82 is aligned with aligned cooperating apertures 54 in the sidewall of the receivers 50. A cooperating pin (not shown) may then be inserted in the aligned apertures 54, 82 and a pin clip (not shown) secured on the end thereof to complete a secure connection.

As further illustrated, each of the support members 60, 62 is substantially L-shaped. Specifically, each of the support members 60, 62 includes a first, transverse bend 66 of between substantially 3–11° (e.g., 7°) in a first plane (the plane of the paper in FIG. 3) so that the support members diverge and a second, vertical bend 68 of between about 90° to about 120° (e.g., 105.5°) in a second plane (the plane of the paper in FIG. 2). The first plane is substantially perpendicular to the second plane.

The second end 70 of each of the pair of spaced support members 60, 62 includes a series of spaced mounting apertures 72. In the illustrated embodiment three spaced mounting apertures 72 are shown. It should be appreciated, however, that substantially any number may be provided to furnish height adjustment capability in a manner described in greater detail below. A cross piece 74 extends between the pair of spaced support members 60, 62 and is secured thereto b) engaging in the spaced mounting apertures 72. More specifically, a pair of pins 76 may be wielded or otherwise secured in the ends of the cross piece 74 so as to project axially. These pins 76 are received in any one of the selected series of corresponding mounting apertures 72 provided in each support member 60, 62. A pin clip 78 may be secured on the end of each of the pins 76 in order to secure the cross piece 74 in position between the support members 60, 62.

With the cross piece 74 installed in the manner described, the proximal ends 64 of the support members 60, 62 are inserted in the ports 52 of the accessory receivers 50. When fully inserted, opposing apertures 82 in the proximal ends 64 are aligned with the cooperating aligned apertures 54 in the sidewalls of the accessory receivers 50. A pin (not shown) of a type known in the art is then inserted through the aligned apertures 54, 65 and a cooperating pin clip is utilized to secure each of the pins in position and complete the connection.

As noted previously, the height of the cross piece 74 may be adjusted upwardly or downwardly by moving the cross piece between the lower, intermediate and upper mounting apertures 72 that allow for height adjustment. In this way the cross piece 74 may be adjusted so as to provide the best possible support to any elongated article or articles having a length exceeding the load bed of the vehicle to which the present invention is mounted or attached.

Advantageously, it should be appreciated that the bed/rack extender assembly 11 is secured at two points (i.e., at both accessory receivers 50) for extra stability and load support. Further, the two-point connection is achieved through a receiver assembly 10 incorporating a hitch receiver box 18 that may be utilized to accept a draw bar or hitch bar for towing a trailer. Thus, the present invention provides excellent versatility for the on-the-go user who requires a vehicle capable of both trailer towing and the ability to stably support elongated loads (e.g. recreational equipment such as a canoe or building materials such as lumber.).

In accordance with yet another aspect of the present invention, it should be appreciated that the orientation of the bed extender assembly 11 may be reversed so that it is anchored in the receiver assembly 10 in a substantially upright position (see FIG. 4). In this orientation, the bed extender assembly 11 may be utilized to support elongated articles on a luggage or roof rack of an SUV or an overhead rack on a pickup truck.

In the upright configuration shown in FIG. 4, the second ends 70 of each of the pair of spaced support members 60, 62 are inserted in the accessory ports 52 in the cooperating pair of accessory receivers 50. Like the first ends 64, the second ends 70 are sized and shaped for complementary receipt in those ports 52. When the second ends 70 are properly seated in the accessory receivers 50, one of the spaced mounting apertures 72 is aligned with the aligned, cooperating apertures 54 in the sidewall of the receivers 50. A cooperating pin (not shown) may then be inserted in the aligned apertures 54, 72 and a pin clip (not shown) secured on the end thereof to complete a secure connection.

Due to the substantially L-shape of the support members 60, 62, the first ends 64 project upward in a vertical direction. The cross piece 74 may be adjusted upwardly or downwardly by moving the cross piece between the lower, intermediate and upper mounting apertures 82 which allow for height adjustment. In this way the cross piece 74 may be adjusted so as to provide the best possible support of any elongated article or articles having a length exceeding the luggage rack or overhead rack of the vehicle to which the present invention is mounted or attached.

As should be appreciated, the cross piece 74 extends between the pair of spaced support members 60, 62 and is secured thereto by engaging the pins 76 in the spaced apertures 82. The pin clips 78 may then be secured on the ends of the pins 76 in order to secure the cross piece 74 in position between the support members 60, 62 just as described above.

The foregoing description of the preferred embodiment of this invention has been presented for purposes of illustration and description. It is not intended to be exhaustive or to limit the invention to the precise form disclosed. Obvious modifications or variations are possible in light of the above teachings. For example, the proximal ends 64 of the two support members 60, 62 could be received in a substantially T-shaped adapter having a mounting end specifically designed for receipt and anchoring in the receiver box of a standard trailer hitch receiver assembly that does not incorporate multiple accessory receivers. Further, the pins 76 and clips 78 could be replaced by the provision of a threaded mounting plate in the ends of the cross piece 74. Each such plate would threadedly engage a bolt to complete the connection.

It should also be appreciated that the receiver assembly 10 does not necessarily need to include a receiver box 18 for the towing of a trailer. Still further, while hollow accessory receivers 50 are shown which provide mounting ports 52, it should be appreciated that the receivers 50 could be solid rods or bars so long as the ends 64, 70 of the support members 60, 62 have a complementary structure to allow secure interconnection therewith.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A receiver assembly for carrying an elongated article or articles having a length exceeding a load bed or rack of a vehicle to which said receiver assembly is attached, comprising:
   a central frame member;
   a pair of mounting brackets carried on said central frame member for securing said receiver assembly to the vehicle;
   a pair of spaced accessory receivers carried on said central frame member; and an extender assembly secured in said pair of spaced accessory receivers,
   wherein said extender assembly is selectively secured to said central frame in one of two different orientations.

2. The receiver assembly of claim 1, further including a hitch receiver box carried on said central frame member.

3. The receiver assembly of claim 1, wherein said extender assembly includes a pair of spaced support members, each of said pair of spaced support members having first and second ends wherein said first ends being received in said pair of spaced accessory receivers to selectively orient said extender assembly in a first Position and said second ends being received in said pair of spaced accessory receivers to selectively orient said extender assembly in a second position.

4. The receiver assembly of claim 3, wherein each of said pair of support members is substantially L-shaped.

5. The receiver assembly of claim 3, wherein each of said pair of spaced support members includes a first, transverse bend of between about 3° to about 11° in a first plane and a second, vertical bend of between about 90° to about 120° in a second plane.

6. The receiver assembly of claim 5, wherein said first plane is substantially perpendicular to said second plane.

7. The receiver assembly of claim 3, wherein the second end of each of said pair of spaced support members includes a series of spaced mounting apertures.

8. The receiver assembly of claim 7, further including a cross piece extending between said pair of spaced support members, said cross piece being secured to said pair of spaced support members by engaging said spaced mounting apertures.

9. The receiver assembly of claim 8 including a pair of pins for securing said cross piece in said spaced mounting apertures.

10. The receiver assembly of claim 3, further including a pair of fasteners, one of said pair of fasteners securing one of said pair of spaced support members in one of said pair of accessory receivers.

11. A receiver assembly for carrying an elongated article or articles having a length exceeding a load bed or rack of a vehicle to which said receiver assembly is attached, comprising:
    a central frame member;
    a pair of mounting brackets carried on said central frame member for securing said receiver assembly to the vehicle;
    a pair of spaced accessory receivers carried on said central frame member; and
    an extender assembly secured in said pair of spaced accessory receivers, said extender assembly being characterized by a pair of spaced support members, each of said spaced support members having first and second opposite ends, said first ends being received in said pair of spaced accessory receivers to selectively orient said extender assembly in a first position and said second ends being received in said pair of spaced accessory receivers to selectively orient said extender assembly in a second position.

12. The receiver assembly of claim 11, wherein each of said pair of support members is substantially L-shaped.

13. The receiver assembly of claim 11, wherein each of said pair of spaced support members includes a first, transverse bend of between about 3° to about 11° in a first plane and a second, vertical bend of between about 90° to about 12° in a second plane.

14. The receiver assembly of claim 13, wherein said first plane is substantially perpendicular to said second plane.

15. The receiver assembly of claim 11 wherein said first and second ends of each of said pair of spaced support members includes a series of spaced mounting apertures.

16. The receiver assembly of claim 15, further including a cross piece extending between said pair of spaced support members, said cross piece being secured to said pair of spaced support members by engaging said spaced mounting apertures at one of said first and second ends of said spaced support members not received in said pair of spaced accessory receivers.

17. The receiver assembly of claim 16 including a pair of pins for securing said cross piece in said spaced mounting apertures.

18. The receiver assembly of claim 11, further including a pair of fasteners, one of said pair of fasteners securing one of said pair of spaced support members in one of said pair of accessory receivers.

19. An extender assembly for selectively mounting in one of two different orientations to a receiver assembly carried on a vehicle, comprising:

a frame having fist and second substantially L-shaped support members, the support members having first ends and a second ends; and a cross piece selectively mounted (a) on said second ends of said support members when said first ends of said support members are secured to the receiver assembly and (b) on a said first ends of said support members when said second ends of said support members are secured to the receiver assembly.

20. The extender assembly of claim 19, wherein said first and second support members both include a first, transverse bend of between about 3° to about 11° in a first plane and a second, vertical bend of between about 90° to about 120° in a second plane.

21. The extender assembly of claim 20, wherein said first plane is substantially perpendicular to said second plane.

22. The extender assembly of claim 19, wherein said first and second support members both include a first series of apertures adjacent a first end thereof and a second series of apertures adjacent a second end thereof.

23. The extender assembly of claim 22, wherein said cross piece further includes a pin at each end for securing in either of said first and said second series of apertures.

* * * * *